US008990009B2

(12) United States Patent
Lennen et al.

(10) Patent No.: US 8,990,009 B2
(45) Date of Patent: Mar. 24, 2015

(54) SYSTEM, METHOD, AND APPARATUS FOR MINIMIZING POWER CONSUMPTION IN A PORTABLE DEVICE CAPABLE OF RECEIVING SATELLITE NAVIGATIONAL SYSTEM SIGNALS

(71) Applicant: Samsung Electronics Co., Ltd., Gyeonggi-do (KR)

(72) Inventors: Gary Lennen, Cupertino, CA (US); Andy Milota, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/048,657

(22) Filed: Oct. 8, 2013

(65) Prior Publication Data

US 2015/0032365 A1 Jan. 29, 2015

Related U.S. Application Data (60) Provisional application No. 61/857,928, filed on Jul. 24, 2013.

(51) Int. Cl.
*G21C 21/00* (2006.01)
*G01S 19/34* (2010.01)
*G01C 21/00* (2006.01)

(52) U.S. Cl.
CPC ................ *G01S 19/34* (2013.01); *G01C 21/00* (2013.01)
USPC ......... 701/410; 701/411; 340/7.32; 340/7.33; 370/311; 342/357.73; 342/357.74

(58) Field of Classification Search
USPC .......... 701/400, 410–412, 533; 370/310, 311; 342/357.74, 357.73; 340/7.32–7.33
See application file for complete search history.

(56) References Cited

U.S. PATENT DOCUMENTS

| 7,359,713 | B1 | 4/2008 | Tiwari | |
|---|---|---|---|---|
| 8,072,379 | B2 | 12/2011 | Gopinath | |
| 8,228,234 | B2 | 7/2012 | Paulson et al. | |
| 2008/0231449 | A1* | 9/2008 | Moshfeghi | 340/572.1 |
| 2009/0043491 | A1* | 2/2009 | Haatainen | 701/201 |
| 2011/0309976 | A1 | 12/2011 | Leclercq et al. | |
| 2013/0120116 | A1* | 5/2013 | Moshfeghi | 340/10.1 |
| 2013/0120118 | A1* | 5/2013 | Moshfeghi | 340/10.4 |

FOREIGN PATENT DOCUMENTS

WO WO 2011/079870 7/2011

* cited by examiner

*Primary Examiner* — Yonel Beaulieu
(74) *Attorney, Agent, or Firm* — The Farrell Law Firm, P.C.

(57) ABSTRACT

Methods, systems, and portable devices which reduce the power used by a portable device to receive/process satellite navigational system signals and/or to compute the portable device's position using satellite navigational system signals are provided. A method includes retrieving information concerning power usage characteristics based on aggregate data corresponding to a current location of the portable device; and selecting a power saving mode based on the retrieved power usage information from the aggregate data, where each of the plurality of power saving modes reduces power usage in at least one of receiving the satellite navigational system signals, processing the satellite navigational system signals, and computing the portable device's position using the satellite navigational system signals.

24 Claims, 6 Drawing Sheets

SYSTEM, METHOD, AND APPARATUS FOR MINIMIZING POWER CONSUMPTION IN A PORTABLE DEVICE CAPABLE OF RECEIVING SATELLITE NAVIGATIONAL SYSTEM SIGNALS

PRIORITY

This application claims priority under 35 U.S.C. §119(e) to U.S. Provisional Patent Application Ser. No. 61/857,928 filed on Jul. 24, 2013, the entire disclosure of which is incorporated herein by reference.

BACKGROUND OF THE INVENTION

1. Field of the Invention

The present invention relates generally to reducing power consumption in a portable device capable of receiving Global Navigation Satellite System (GNSS) signals, and more particularly, to minimizing battery usage in a portable device having a GNSS receiver being used for navigation.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global or not, unless expressly indicated otherwise.

The number of GNSS systems, both planned and presently operational, is growing. The widely-known, widely-used, and truly global Global Positioning System (GPS) of the United States has been joined by one other global system, Russia's *GLObalnaya NAvigatsionnaya Sputnikovaya Sistema* (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

Moreover, GNSS capabilities are no longer limited to any particular type of system or device. A GNSS receiver may be implemented in a cellular phone, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

When a GNSS receiver is implemented in a portable and/or mobile device which relies upon one or more batteries for power, the components used for GNSS signal reception, signal processing, and positional calculation use a substantial amount of power. This is true even when the GNSS capability is only being used to compute a single position fix, such as, for example, when a cell phone user uses an application to find nearby restaurants or stores, or to view local real estate information. The tracking of a portable/mobile device with GNSS capabilities is an even bigger drain on battery resources. When the GNSS capability is being used for continuous updating of positional information, such as when navigating a route in a moving vehicle or while walking in unfamiliar terrain, it is a particularly large drain on the one or more batteries, potentially resulting in the one or more batteries not lasting until the end of the route being navigated.

Thus, there is a need for a system, method, and/or apparatus to reduce the power consumption of the one or more components used to provide a GNSS capability in a portable device powered by one or more batteries.

SUMMARY OF THE INVENTION

The present invention addresses at least the problems and disadvantages described above and provides at least the advantages described below. According to one aspect of the invention, a portable device capable of receiving GNSS signals is configured to adapt GNSS system resource usage to expected/predicted resource requirements during travel. According to another aspect of the present invention, the power consumption by GNSS signal reception, processing, and/or positional computing is minimized during route navigation by using adaptive systems and methods which store and analyze data concerning system resource conditions and usage. According to yet another aspect of the invention, the data concerning system resource conditions and usage is aggregated from many portable devices traversing the same, nearby, or similar regions. According to still another aspect of the invention, mapping/navigational data is used in the adaptive systems and methods for minimizing power consumption by GNSS signal reception, processing, and/or positional computing.

According to an embodiment of the present invention, a method for reducing power consumption of a portable device capable of receiving satellite navigational system signals includes retrieving information concerning one or more power usage characteristics corresponding to a current location of the portable device, where the power usage information is based on aggregate data from power usage data of one or more portable devices traversing the current location; and selecting a power saving mode from a plurality of power saving modes based at least on the retrieved power usage information from the aggregate data, where each of the plurality of power saving modes reduces power used by the portable device in at least one of receiving the satellite navigational system signals, processing the satellite navigational system signals, and computing the portable device's position using the satellite navigational system signals.

According to another embodiment of the present invention, a method for a portable device having a mapping client and a receiver of satellite navigational system signals includes retrieving map data of a current location of the portable device; computing at least one of a time until next event (TNE) and a time between events (TBE) based on the retrieved map data; and selecting a power saving mode from a plurality of power saving modes based on at least one of TNE and TBE, where each of the plurality of power saving modes reduces power used by the portable device in at least one of receiving the satellite navigational system signals, processing the satellite navigational system signals, and computing the portable device's position using the satellite navigational system signals.

According to another embodiment of the present invention, a method for reducing power consumption in a portable device capable of receiving satellite navigational system signals includes computing a route to a destination; and selecting a power saving mode from a plurality of power saving modes for each of one or more segments of the computed route based at least on one or more characteristics of the one or more segments, where each of the plurality of power saving modes reduces power used by the portable device in at least one of receiving the satellite navigational system signals, processing the satellite navigational system signals, and computing the portable device's position using the satellite navigational system signals.

According to another embodiment of the present invention, a method for a portable device to reduce power used in receiving and processing of satellite navigational system signals includes reducing a rate at which positional updates/fixes are made using satellite navigational system signals; and estimating a current position of the portable device in between the positional updates/fixes that use satellite navigational system signals by using map data of a specific region the portable device is traversing.

According to another embodiment of the present invention, a portable device includes a receiver configured to receive satellite navigational system signals; one or more processors; and at least one non-transitory computer-readable medium having program instructions recorded thereon, the program instructions configured to have the one or more processors perform the step of: selecting a power saving mode for a specific region of traversal by the portable device from a plurality of power saving modes based on one or more characteristics of the specific region of traversal, where each of the plurality of power saving modes reduces power used by the portable device in at least one of receiving the satellite navigational system signals, processing the satellite navigational system signals, and computing the portable device's position using received satellite navigational system signals.

According to another embodiment of the present invention, a portable device includes a receiver configured to receive at least satellite navigational system signals; one or more processors; and at least one non-transitory computer-readable medium having program instructions recorded thereon, the program instructions configured to have the one or more processors perform and/or otherwise control performance of the steps of: retrieving map data of a specific region which the portable device is presently in; reducing a rate at which positional updates/fixes are made using the satellite navigational system signals; and estimating a current position of the portable device in between the positional updates/fixes that use satellite navigational system signals by using the retrieved map data.

According to another embodiment of the present invention, a system for reducing the power used by portable devices to receiving satellite navigational system signals includes one or more data aggregation servers configured to receive power usage data from one or more portable devices, the power usage data concerning the one or more portable devices' traversal of a specific region, to aggregate received power usage data such that power usage characteristics are determined for one or more specific locations in specific regions, and to provide information concerning determined power usage characteristics for one or more locations in a specific region to one or more portable devices, wherein the one or more portable devices use the provided information to select a power saving mode for traversing the one or more locations in the specific region from a plurality of power saving modes, where each of the plurality of power saving modes reduce power used by the one or more portable devices in at least one of receiving the satellite navigational system signals, processing the satellite navigational system signals, and computing the portable device's position using the satellite navigational system signals.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will be described in detail below with reference to the accompanying drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

In general, the present invention relates to improvements in power consumption/saving for any portable device having a mapping capability and a GNSS receiver/processing capability, where various embodiments of the present invention may have one or more of the following:

(1) the use of specific features from map data of regions of traversal to modify GNSS system usage;

(2) the use of timing calculations involving events, including, but not limited to, time to next event (TNE) and time between events (TBE), based on, e.g., mapping/navigational data of a specific region being traversed to adapt/modify GNSS system usage;

(3) the aggregation of data concerning specific regions of traversal over time, where that data comes from any GNSS receiver which travels in and/or through one or more of those regions, and where that aggregated data is used to adapt/modify GNSS system usage of any GNSS receivers travelling through any of those regions;

(4) power saving modes where the rate of computing position updates/fixes using GNSS is reduced for specific areas and/or times, and where position updates/fixes may be estimated, in between position updates/fixes using GNSS, without using GNSS; and (5) adaptive methods and systems using data aggregated from an individual or a group (i.e., "crowdsourcing"), and/or data being continuously/periodically updated during navigation, concerning power usage characteristics, such as battery life, estimated remaining battery life, battery drain characteristics, etc.

Figure 1:
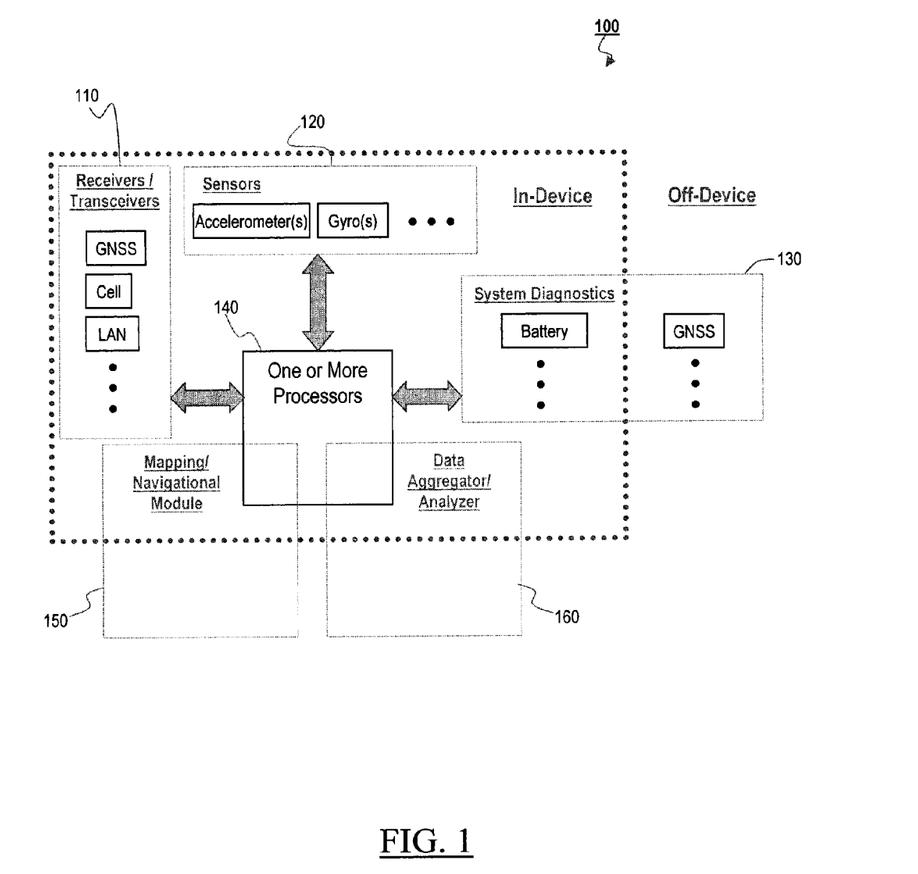
FIG. 1 is a diagram of a portable device according to an embodiment of the present invention.

FIG. 1 is a diagram of a portable device according to an embodiment of the present invention. Portable device 100 could be any of, e.g., a cellular telephone, a notepad computer, a laptop computer, a portable navigational tool, or a navigational tool which can be removably plugged into or otherwise integrated into a type of moving vehicle, such as, for example, an automobile. Portable device 100 is represented by a shaded and dotted-line box, labeled "In Device," to indicate that one or more functional components according to the present invention may have parts in portable device 100 and parts outside of portable device 100, as will be discussed in further detail below.

Portable device 100 has a plurality of receivers and transceivers 110, including a GNSS receiver, a cellular telecommunications system transceiver, and a Wireless Local Area Network (WLAN) transceiver, such as, e.g., an IEEE 802.11 or Bluetooth transceiver. These receivers/transceivers 110 may have separate antennae and reception chains, and/or two or more may share an antenna and/or one or more components in the reception chain. The three solid dots in the receiver/transceiver 110 box indicate here, and elsewhere in this application, that more receivers/transceivers may exist in portable device 100. Although the three receiver/transceivers shown in FIG. 1 are for wireless transmission, receivers/transceivers 110 used by portable device 100 according to embodiments of the present invention are not so limited in scope.

Portable device 100 has sensors 120, which includes one or more accelerometers and one or more gyroscopic sensors, although as indicated by the three solid dots, more sensors may exist in portable device 100. Portable device 100 also has various system diagnostic components 130, including battery diagnostics (for monitoring, e.g., remaining power level and present power usage) and GNSS diagnostics. While the battery diagnostics are shown in-device in FIG. 1, the GNSS diagnostics are shown as off-device because either the diagnostics or the signals upon which the diagnostics are calculated may originate outside of portable device 100. For example, in an augmented GNSS system, GNSS systems conditions may be transmitted to portable device 100 through terrestrial wireless transmission. As another example, the raw diagnostic data may originate with the GNSS satellite transmissions received by portable device 100.

Portable device 100 also has one or more processors 140. As is well-known to one of ordinary skill in the art, the number of processors would depend on the specific portable device in which the present invention is being implemented. For example, a cellular telephone may have less, and less-specialized, processors than a laptop computer, and thus some of the functions described herein in relation to one or more processors 140 may be further distributed among various processors in a laptop computer than in a cellular telephone. As another example, depending on the embodiment, the receivers/transceivers 110 and sensors 120 may have independent hardware controllers (which constitute processors) which perform functions for direct control of one or more components, while one or more separate processors perform most of the analysis and processing discussed herein in reference to embodiments of the present invention. The various possibilities would be understood by any of ordinary skill in the art.

In FIG. 1, the double-sided gray arrows connecting the one or more processors 140 with the various other components in portable device 100 indicate bi-directional transmission of data and/or control information between the connected elements. The manner in which such transmissions would be made depends on the specific implementation of portable device 100, as would be understood by one of ordinary skill in the art. For example, in a laptop computer there may be one or more system busses for sending and receiving data from the receivers/transceivers 110, while sensors 120 may have one or more controllers which communicate directly with both the sensors 120 and the one or more processors 140. The various possibilities for implementing the bi-directional communication indicated by the gray arrows in FIG. 1 would depend upon the specific type and purpose of portable device 100, as would be understood by any of ordinary skill in the art.

According to an embodiment of the present invention, portable device 100 also has mapping/navigational module 150 and data aggregator/analyzer 160. In FIG. 1, both mapping/navigational module 150 and data aggregator/analyzer 160 are shown as both overlapping one or more processors 140 and extending outside portable device 100. As discussed above, extension outside portable device 100 in FIG. 1 indicates that portions of mapping/navigational module 150 and data aggregator/analyzer 160 may be implemented outside of portable device 100. The overlap with one or more processors 140 indicates that portions of mapping/navigational module 150 and data aggregator/analyzer 160 may be in the form of program instructions that are executed on the one or more processors 140. While other components may also be in the form of program instructions executed on one or more processors 140, such as some of the system diagnostics 130, the fact that such components may or may not be executed on one or more processors 140 is peripheral to the description of embodiments of the present invention, and thus are not shown to avoid obscuring the present invention in unnecessary detail. In any event, one of ordinary skill in the art would know these details as one of the various design choices to be made when implementing portable device 100 in a specific embodiment.

Mapping/navigational module 150 provides mapping/navigational information to portable device 100. Although mapping/navigational module 150 provides both mapping and navigational information in this embodiment, the term "navigational/mapping" as used herein means navigational and/or mapping. This mapping/navigational information may be based on the current position of portable device 100, determined/calculated using at least data received by the GNSS receiver, and/or based on data input by, e.g., the user of portable device 100. Depending on the specific embodiment, mapping/navigational module 150 will access and use mapping/navigational data stored on at least one of portable device 100, a local mapping/navigational information service, and/or a network mapping/navigational information service. If portable device 100 has navigation as its primary purpose, all mapping/navigational data may be stored in portable device 100 and may be updated by connecting over a network with a central mapping/navigational information service. If portable device 100 is primarily a telecommunications terminal, only the most immediately needed mapping/navigational information may be cached locally, e.g., on portable device 100, and almost all mapping/navigational data originates from, and is stored by, a service which transmits information to portable device 100 over a cellular telecommunications network. For example, a user of a cell phone might use GoogleMaps to obtain a map of the user's current environment, in which case the location may be determined by GNSS, and that determined location is provided over the cellular network, and then over the Internet, to GoogleMaps servers, which, in turn, send back maps for display on the user's cell phone. However, even in this instance, intermediate servers and/or the cell phone itself may cache some of the mapping/navigational information. GoogleMaps is an example of a network mapping/navigational information service, and local mapping/navigational information service may be provided, for example, locally as a standalone service (by a city) and/or as a local augment to one or more network mapping/navigational information services.

Data aggregator/analyzer 160 logs data concerning power usage/consumption characteristics and conditions which can be used to modify and/or adapt power consumption/saving methods for portable device 100 as data is logged over time, as will be discussed in greater detail in reference to specific embodiments described below. Sources for the data logged by data aggregator/analyzer 160 may include, without limitation, any of receivers/transceivers 110, sensors 120, system diagnostics 130, one or more processors 140, and/or mapping/navigational module 150, including data generated by off-device apparatus(es) and system(s) and received by any of receivers/transceivers 110. Any raw data received and/or generated by portable device 100 may be processed and/or otherwise modified by one or more processors 140 before being stored by data aggregator/analyzer 160. The specific types, amounts, sampling intervals, timing, etc. of the data to be logged by data aggregator/analyzer 160 varies greatly, and depends on, e.g., the specific implementation of portable device 100, as will be discussed in greater detail in reference to specific embodiments described below.

Depending on the specific embodiment, data aggregator/analyzer 160 stores the data on at least one of portable device 100, one or more local data aggregator/analyzer services, and/or one or more network data aggregator/analyzer services. Different types of data, including mapping/navigational and/or power usage/consumption analyses/adaptations determined over specific intervals of time, may be stored in different locations—in other words, like data aggregator/analyzer 160 itself, the data stored by data aggregator/analyzer 160 may be distributed amongst different storage units in different areas. A local data aggregator/analyzer service according to embodiments of the present invention may be a user's mapping/navigational profile stored at a location frequently visited by the user of portable device 100. For example, a user's mapping/navigational profile may be stored on a storage unit in a user's home and logged data is either continually transmitted to it via the Internet and the cellular telecommunications network or periodically uploaded, i.e., whenever portable device 100 can connect via the user's home WLAN to the storage unit. A local data aggregator/analyzer service according to embodiments of the present invention may also be a regional service shared amongst many users. For example, data regarding a specific area (such as, e.g., a section of highway) may be stored and/or accessed by any users of a local data aggregator/analyzer service (based, e.g., in a city or county), where the data aggregated from all individual users is used to adapt/modify power consumption/saving methods of any portable device 100 accessing the local logging service. Similarly, a network data aggregator/analyzer service would store data regarding a specific area (such as, e.g., a section of highway) but, since the network data aggregator/analyzer service is provided over one or more networks, the number of users and/or portable devices capable of using a network data aggregator/analyzer service is orders of magnitude greater than those possible with a local data aggregator/analyzer service.

In that regard, "crowdsourcing"—i.e., the sharing of information amongst large numbers of people, typically via electronic means over a network is a distinctive advantage of some embodiments of the present invention. In contrast to previous systems, which may store information over time concerning a specific user (where that information may be stored locally or via a network), crowdsourcing embodiments of the present invention store information over time regarding a specific region (such as, e.g., a section of highway), where any users presently in that region accessing the network logging service add to the aggregate data concerning that specific region, thereby improving power consumption/saving for any users in that specific region in the future.

Figure 2:
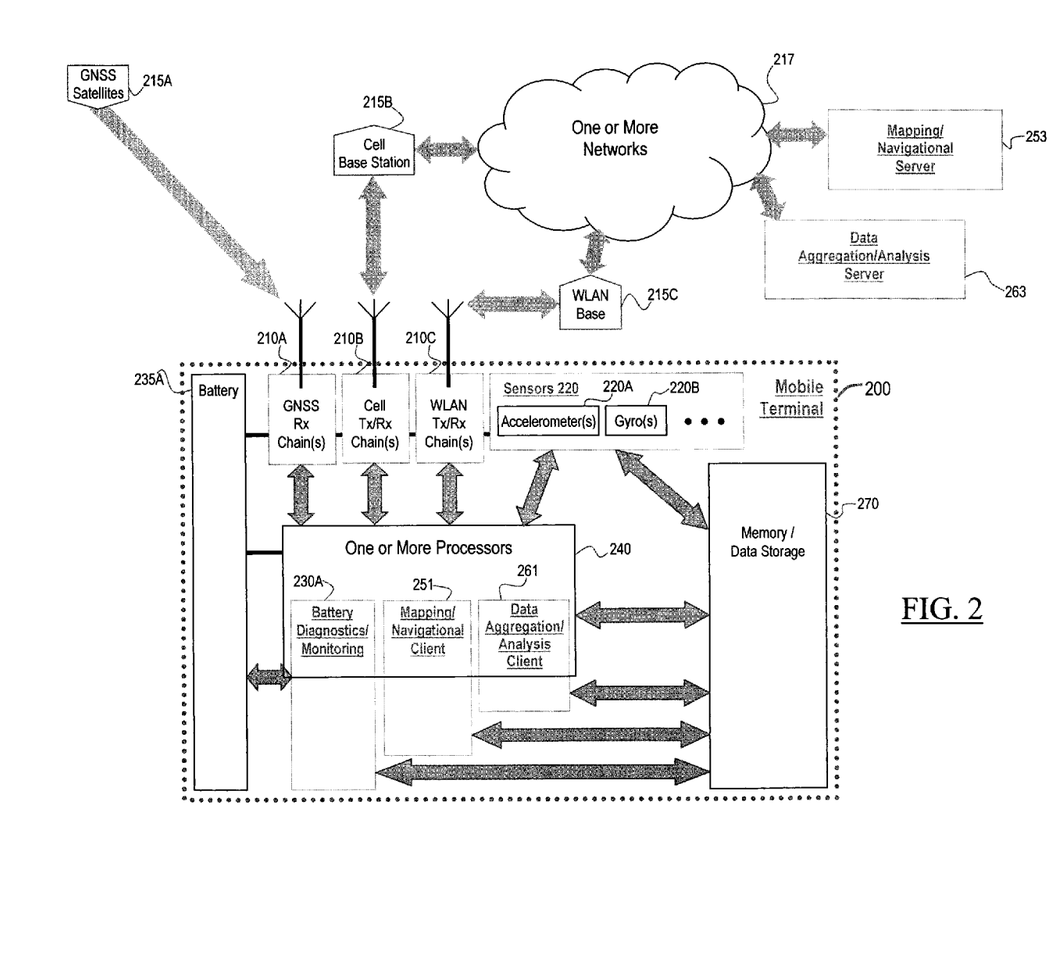
FIG. 2 is a diagram of a mobile terminal according to an embodiment of the present invention.

FIG. 2 is a diagram of a mobile terminal 200 according to an embodiment of the present invention. Mobile terminal 200 could be any of, e.g., a cellular telephone, a camera, multimedia player, a notepad computer, or any personal consumer electronic device having GNSS capability and network inter-connectability. Although it may have more, only three of the receiver/transceivers of mobile terminal 200 are shown in FIG. 2: GNSS receiver 210A, a cellular telecommunications system transceiver 210B, and a Wireless Local Area Network (WLAN) transceiver 210C. These receivers/transceivers 210 and any other receivers/transceivers in mobile terminal 200 may have separate antennae and reception chains, and/or two or more may share an antenna and/or one or more components in the reception chain. GNSS receiver 210A receives signals from a plurality of GNSS satellites 215A of one or more GNSS system constellations, including, e.g., GPS, Galileo, GLONASS, and/or BeiDou. Cell transceiver 210B receives and transmits signals to one or more local base stations 215B using one or more mobile telecommunications standards, such as, e.g., the various Long Term Evolution (LTE) telecommunication standards promulgated by the $3^{rd}$ Generation Partnership Project (3GPP). WLAN transceiver 210C receives and transmits signals to one or more WLAN base stations 215C, using one or more of the IEEE 802.11 standards.

Both the cell base station(s) 215B and WLAN base station(s) 215C are capable of bidirectional communication with one or more networks 217, such as the Internet. In this embodiment, mapping/navigational server 253 and data aggregation/analysis server 263 are also connected to the Internet, and thus mobile terminal 200 has at least two communication paths for transmitting and receiving information to and from mapping/navigational server 253 and data aggregation/analysis server 263. In other embodiments, mapping/navigational server 253 and/or data aggregation/analysis server 263 may have more and/or different communication links with mobile terminal 200. Similarly, in other embodiments, mapping/navigational server 253 and/or data aggregation/analysis server 263 may be located in other locations, such as, for example, in the mobile telecommunications network or as part of a Wide Area Network (WAN) accessed through a web of WLAN base stations covering a region. Details concerning the operation of mapping/navigational server 253 and data aggregation/analysis server 263 will be discussed further below.

Mobile terminal 200 has a plurality of sensors, including one or more accelerometers 220A and one or more gyroscopic sensors 220B. Mobile terminal 200 also has at least one battery 235A which powers one or more components of mobile terminal 200.

Mobile terminal 200 has one or more processors 240. As discussed above, the number, type, location, etc., of processors would depend on the specific implementation of mobile terminal 200. Mobile terminal 200 also has memory/data storage 270, which may comprise one or more of Random Access Memory (RAM), Read-Only Memory (ROM), flash memory, a disk drive, and any other means known to those of ordinary skill in the art for storing data on a mobile terminal. Besides being comprised of different types of data storage, memory/data storage 270 may be distributed amongst a plurality of memories/data storages in mobile terminal 200. As shown in FIG. 2, one or more processors 240 have one or more uni- and/or bidirectional communication links with, inter alia, memory/data storage 270, receivers/transceivers 210, and sensors 220. As discussed above, these various communication links may be implemented in a variety of ways well-known to those of ordinary skill in the art, including, without limitation, one or more busses and/or one or more direct wired connections. Other uni- and/or bidirectional communication links may exist in mobile terminal 200, such as communication links between one or more of the receivers/transceivers 210 and memory/data storage 270, but are not shown in FIG. 2 to avoid obscuring the salient features of mobile terminal 200 according to this embodiment of the present invention.

At least a portion of each of mapping/navigational client 251, data aggregation/analysis client 261, and a battery diagnostics/monitoring application 230A is running on one or more processors 240. In this and other embodiments, other portions of mapping/navigational client 251, data aggregation/analysis client 261, and battery diagnostics/monitoring application 230A may be implemented in hardware and/or firmware.

Battery diagnostics/monitoring application 230A monitors a stored power level of battery 235A and can be used to estimate present and future power consumption, and break down present, projected, and/or estimated future power usage by application and/or component, etc. As shown in FIG. 2, battery diagnostics/monitoring application 230A may store any such battery data in memory/data storage 270 and/or otherwise provide battery data to applications running on one or more processors 140, including mapping/navigational client 251 and data aggregation/analysis client 261, which, in turn, may further process the received battery data and store raw and/or processed battery data in memory/data storage 270 and/or through data aggregation/analysis server 263. The bi-directional communication arrow between battery 235A and battery diagnostics/monitoring application 230A in FIG. 2 overlaps the corner of one or more processors 240 in order to indicate that one or more processors 240 may receive raw data directly from battery 235A (which is used by battery diagnostics/monitoring application 230A running on one or more processors 240), and/or receive raw and/or processed data through/from battery diagnostics/monitoring application 230A (when, e.g., portions of battery diagnostics/monitoring application 230A are implemented outside of one or more processors 240). Furthermore, the bi-directional communication arrow between battery diagnostics/monitoring application 230A and memory/data storage 270 in FIG. 2 shows that battery diagnostics/monitoring application 230A may store raw and/or processed battery data either directly to battery diagnostics/monitoring application 230A or through one or more processors 240.

Battery diagnostics/monitoring application 230A may also use, store, and/or process aggregate data from data aggregation/analysis client 261 as part of its functions for estimating present and/or future battery usage. In other words, battery diagnostics/monitoring application 230A may use (1) the past history of battery 235A usage in mobile terminal 200, as correlated with specific regions identified by mapping data, to estimate future usage when traversing the same or nearby regions; and/or (2) the past history of battery usage of all portable devices which have aggregated data to data aggregation/analysis server 263 concerning the specific regions identified by mapping data, to estimate future usage on the same or nearby regions. Although battery diagnostics/monitoring application 230A is shown separately from mapping/navigational client 251 and data aggregation/analysis client 261 in FIG. 2, all or part of the functions of battery diagnostics/monitoring application 230A could be implemented in mapping/navigational client 251 and/or data aggregation/analysis client 261 according to embodiments of the present invention. This is especially true for functions more directly related to embodiments of the present invention, such as, for example, estimating future battery usage by GNSS-related components and/or processing in order to determine appropriate power saving modes. In embodiments where such higher-level analysis and/or computing concerning battery usage is implemented in at least one of mapping/navigational client 251 and data aggregation/analysis client 261, any battery monitoring hardware/software already present in mobile terminal 200 could be used for raw data and perhaps simple analytical tools (as already implemented in mobile terminal 200).

Mapping/navigational client 251 requests mapping/navigational data from mapping/navigational server 253, where such request may be used on, e.g., user input and/or the current position of mobile terminal 200, as estimated/calculated using at least data received by GNSS receiver 210A. As discussed in reference to the external communication links above, communications/requests from mapping/navigational client 251 may be transmitted to the one or more networks 217, to which mapping/navigational server 253 is connected, through the cellular telecommunications network via cell base stations 215B, the WLAN via WLAN base stations 215C, a combination of the two, and/or another communication means.

Data aggregation/analysis client 261 controls and/or directs the logging of data concerning, inter alia, the route actually taken by mobile terminal 200, the average, instantaneous, and/or changes in mobile terminal 200's speed, and/or other events, such as stops and retracing of a route, undergone by mobile terminal 200 in a specific region, as well as power usage characteristics, such as battery drain characteristics, power used per application, which applications are/were running, GNSS system resource usage, GNSS update/fix frequency, etc. This logged data originates at least from battery diagnostics/monitoring application 230A and sensors 220, and is stored, indexed, sorted, and/or otherwise found at least by the specific region in which the data was recorded, and the specific region is identified, indexed, and/or otherwise stored with the logged data in such a way as to relate the logged data directly to features in maps of that specific region generated/produced by mapping/navigational client 251. For example, when the user of mobile terminal 200 is using mapping/navigational client 251 to navigate a particular stretch of highway, data aggregation/analysis client 261 may be logging the speed of the mobile terminal as it proceeds along the route indicated by mapping/navigational client 251. This logged data would be stored and/or indexed by at least one of the route identified by the mapping/navigational client 251 and the route actually taken by mobile terminal 200. Furthermore, in some embodiments, data aggregation/analysis client 261 may be operational even when mapping/navigational client 251 is not being used.

Data aggregation/analysis client 261 logs the data at least one of on memory/data storage 270 and through data aggregation/analysis server 263. When stored through data aggregation/analysis server 263, the logged data may be at least one of continuously, periodically, and/or batch uploaded from data aggregation/analysis client 261 to and/or at the direction of data aggregation/analysis server 263, which stores any logged data in one or more databases. In this manner, data concerning a specific region is collected and/or aggregated from any users of any devices with a data aggregation/analysis client 261 which traverse that specific region. Moreover, the results of any analysis based on that logged data may be shared with, e.g., a user of a portable device having a data aggregation/analysis client 261 which is traversing that specific region for the first time. For example, if logged data concerning a specific region indicates that frequent GNSS updates/fixes are not necessary on a particular stretch of highway, a user with a portable device having data aggregation/analysis client 261 traversing that stretch of highway for the first time could implement power saving by decreasing the frequency of GNSS updates/fixes, based on other users' logged data.

Although mapping and data logging clients 251 and 261 and servers 253 and 263 are shown separately in FIG. 2, either or both of the clients 251/261 and servers 253/263 could be combined in embodiments of the present invention. For example, data aggregation/analysis server 263 may be implemented as part of the service provided by mapping/navigational server 253. In such an embodiment, users could sign up for the service on the Internet and then download either a separate data aggregation/analysis client 261 or a mapping/navigational client 251 into which the functions of data aggregation/analysis client 261 are integrated into one or more of their portable devices. Furthermore, mapping/navigational client 251 could provide the user with information aggregated from all of the users' logged data, such as the average speed on a section of highway at different times of day, or a comparison of speeds and times between two or more routes to the same location.

Moreover, although mapping and data logging servers 253 and 263 are each shown as singular entities in FIG. 2, it is highly likely the functions of each/both would be distributed among a plurality of hardware components connected by one or more private and/or public networks. For example, the processing of user requests and the provisioning of mapping/navigational data to users by mapping/navigational server 253 may be performed by one or more network servers, while the storage of mapping/navigational data may be implemented in a database server farm and/or some form of "cloud" storage. As another example, data aggregation/analysis server 263 may store the user logged data in a plurality of caches, where each cache stores data concerning one or more specific regions. In such an embodiment, each cache would be relatively immediately available by one or more communication links to users presently located in the one or more specific regions corresponding to the logged data stored on that cache.

Figure 3A:
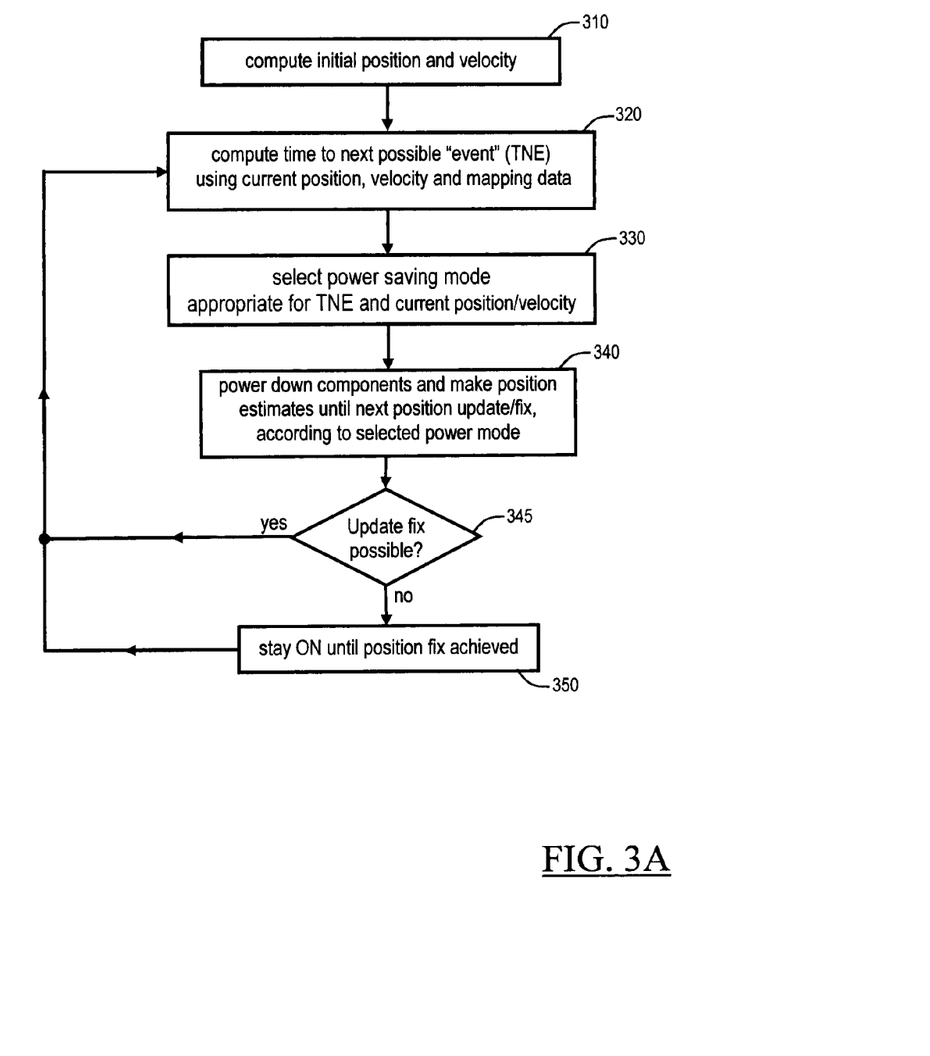
FIG. 3A is a flowchart illustrating a method for selecting a power saving mode for mobile terminal 200, according to an embodiment of the present invention.
Figure 4:
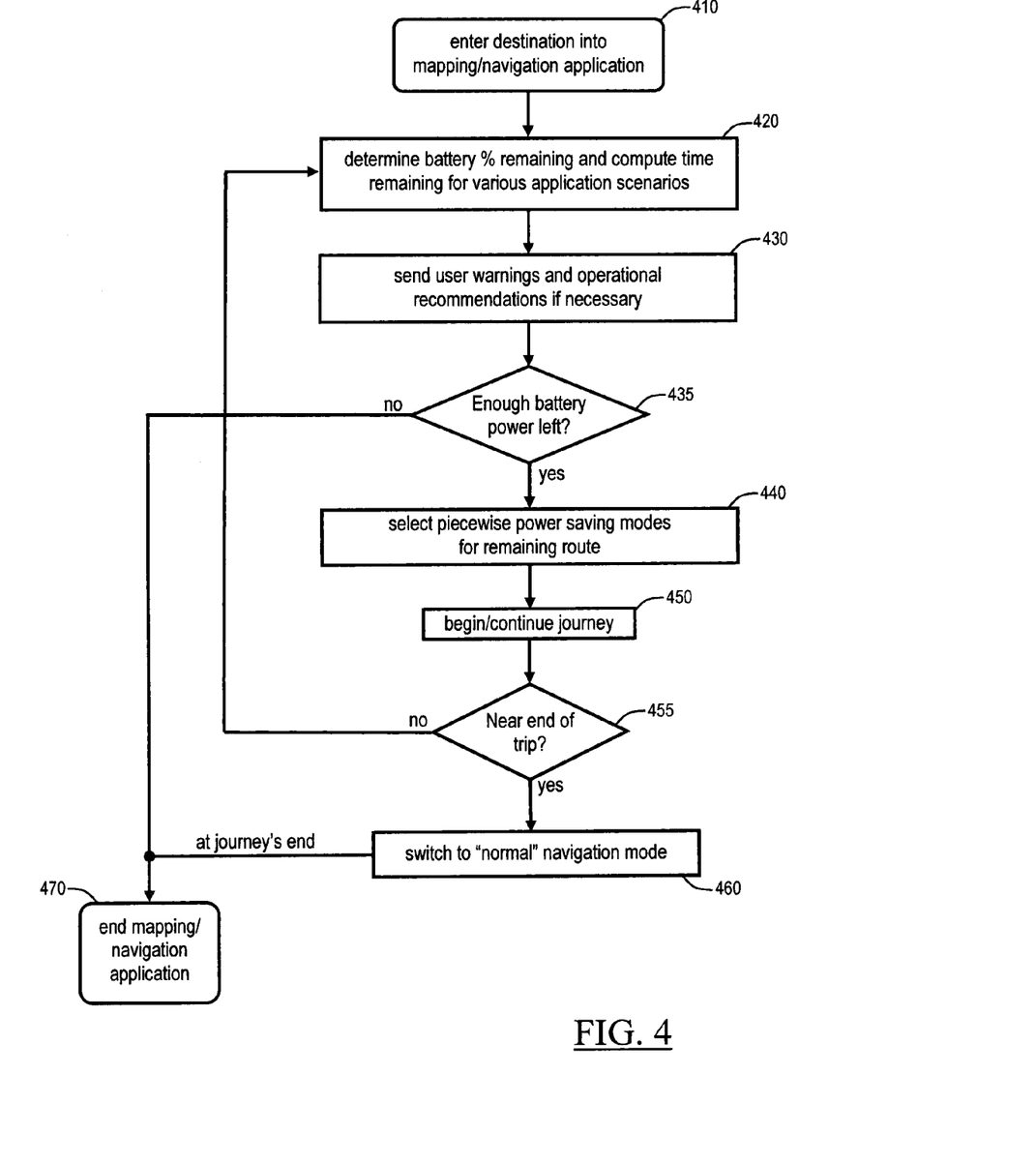
FIG. 4 is a flowchart illustrating a method for determining and then adaptively redetermining power saving modes for segments of a route to a specific destination, according to an embodiment of the present invention.
Figure 5:
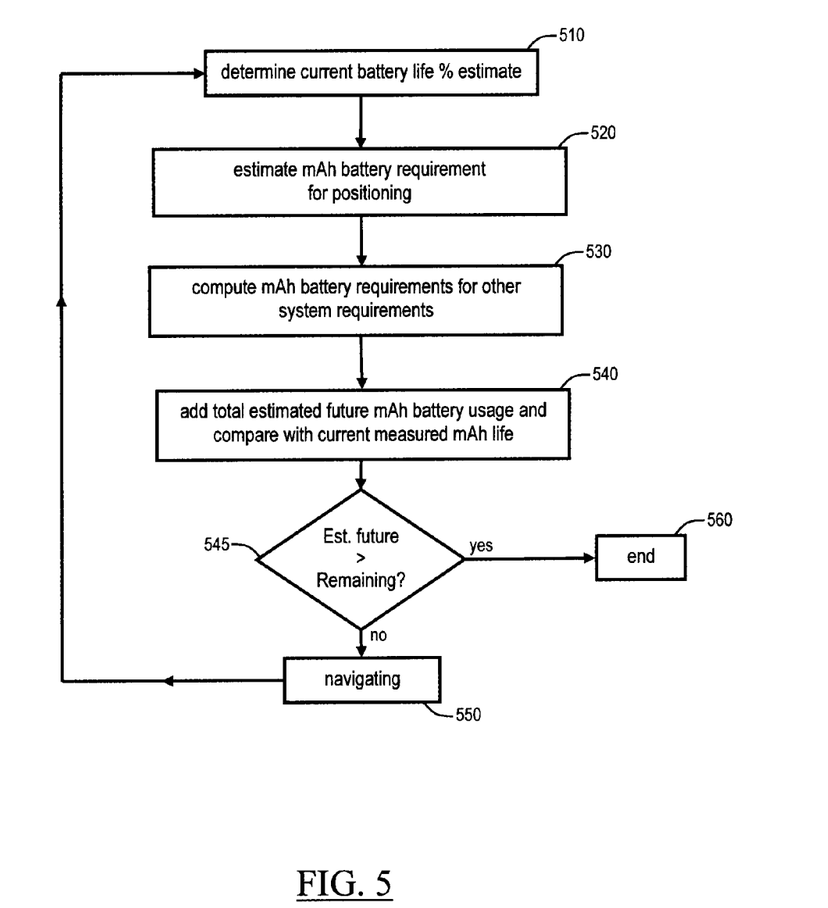
FIG. 5 is a flowchart illustrating a method for adaptively computing remaining battery power, according to an embodiment of the present invention.

FIGS. 3A, 4, and 5 are flowcharts of methods involved in minimizing power consumption while mobile terminal 200 is navigating and/or otherwise using GNSS according to embodiments of the present invention. The method in FIG. 3A is for selecting a power saving mode for mobile terminal 200, where the power saving mode includes, inter alia, at least one of a reduced rate for making position updates/fixes by GNSS, powering down one or more GNSS components during the "down" time between position updates/fixes by GNSS, and making estimated position updates/fixes without GNSS during the "down" time between position updates/fixes by GNSS. The method in FIG. 4 is for precalculating and then adaptively redetermining power saving modes for segments of a route provided by mapping/navigational client 251 to a specific destination, according to an embodiment of the present invention. The method of FIG. 4 also provides the user with warnings and recommendations concerning power saving, and continually updates estimates concerning future power usage against the measured actual power remaining. The method in FIG. 5 is for adaptively computing remaining battery power according to an embodiment of the present invention.

Figure 3B:
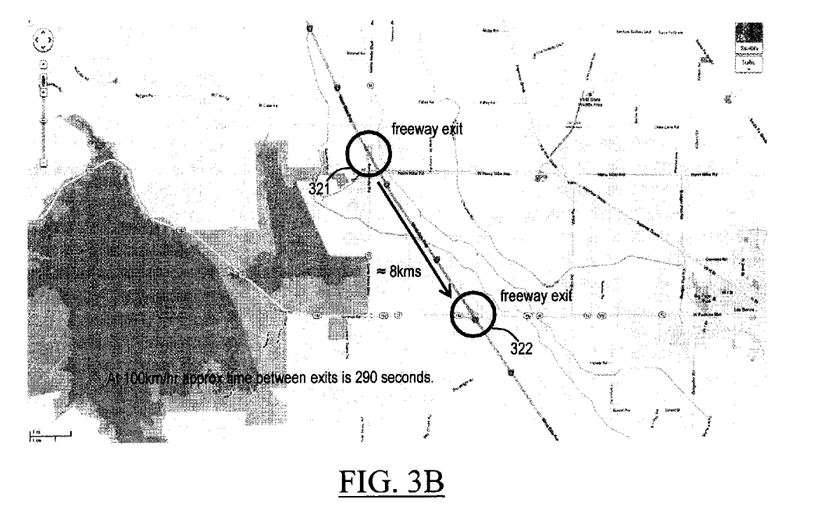
FIGS. 3B and 3C are maps illustrating examples of "events" and the calculation of the time to the next possible event (TNE) on the highway and in the city, respectively, according to embodiments of the present invention.
Figure 3C:
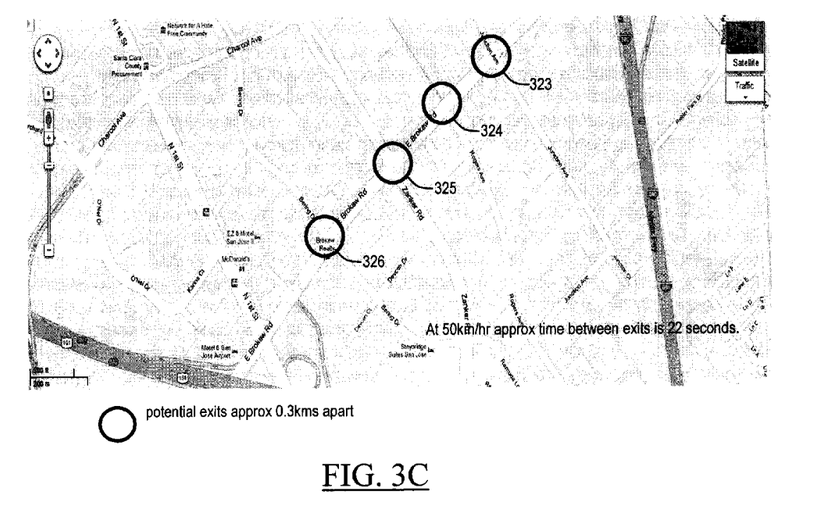

As mentioned above, FIG. 3A is a flowchart of a method to adaptively select an appropriate power saving mode for mobile terminal 200 to make position updates/fixes, according to an embodiment of the present invention. FIGS. 3B and 3C are maps illustrating examples of "events" and calculating the time to the next possible event on the highway and in the city, respectively, according to embodiments of the present invention.

In step 310 of FIG. 3A, the mobile terminal's initial position and velocity are computed, using, inter alia, data from GNSS receiver 210A and sensors 220, which is processed by the one or more processors 240. Mapping/navigational client 251 uses at least this data to retrieve mapping/navigational data corresponding to the computed position. In step 320, using the current position and velocity of mobile terminal 200 (which, in this first iteration of the loop in FIG. 3A, is the initial position and velocity computed in step 310), as well as the mapping/navigational data retrieved by mapping/navigational client 251, the time to the next possible "event" (TNE) is computed by data aggregation/analysis client 261 in step 320.

An "event" according to embodiments of the present invention is a time, location, and/or any other occasion where an accurate update of the present position of mobile terminal 200 should be provided to either the user or mobile terminal 200, such as when the vehicle carrying mobile terminal 200 unexpectedly changes course, or a time where it is likely the user of mobile terminal 200 will require an accurate update of the user's present position. In this context, "an accurate update" means an update computed by using more resources of mobile terminal 200 than required for an update computed and/or otherwise provided when mobile terminal 200 is in a power-saving mode. For example, when in one power saving mode, mobile terminal 200 may provide a position update which is based purely on an estimate from logged data concerning the stretch of highway the mobile terminal 200 is currently traversing, while, by comparison, an "accurate update" would be one where the GNSS receiver 210A is fully powered on to receive and process satellite signals, and one or more processors 240 are used to calculate the current location using, inter alia, the received and processed GNSS signals. The TNE is the estimated time until an event, i.e., the estimated time until an accurate update should be computed, and the TBE is the estimated time between events, i.e., the estimated time between occasions where an accurate update should be computed.

FIGS. 3B and 3C are maps illustrating examples of events and calculating the time to the next event and between events, according to embodiments of the present invention. In the map of FIG. 3B, the locations of two events 321 and 322 are shown on the freeway being traversed by mobile terminal 200, which correspond to exits on the freeway being traversed by mobile terminal 200. If the velocity of mobile terminal 200 is computed at 100 km/hr, the time between events 321 and 322 is 290 seconds, which means that, when mobile terminal is located at the freeway exit corresponding to event 321, the TNE is 290 seconds. In the map of FIG. 3C, the locations of four events 323-326 are shown on a roadway through a city. Like events 321 and 322, events 323-326 also correspond to exits, although, as mentioned above, an "event" according to embodiments of the present invention corresponds to any occasion where an accurate update of the present position of mobile terminal 200 should be provided to either the user or mobile terminal 200. Because mobile terminal 200 is travelling on city streets in FIG. 3C, its velocity is much slower, roughly 50 km/hr, than its velocity in FIG. 3B. Since the exits are roughly equidistant, approximately 0.3 km apart, and the velocity of mobile terminal 200 is 50 km/hr, the time between events (TBE) while mobile terminal 200 is traversing that section of roadway in FIG. 3C is 22 seconds.

Thus, as shown by the examples in FIGS. 3B and 3C, data aggregation/analysis client 261 computes the TNE and/or TBE in step 320 of the method in FIG. 3A, using the current position/velocity of mobile terminal 200 and mapping/navigational data provided by mapping/navigational client 251. The features indicated by the mapping/navigational data help to identify locations corresponding to events, such as, in the examples of FIGS. 3B and 3C, exits from the road currently being traversed.

Referring back to FIG. 3A, in step 330, data aggregation/analysis client 261 selects the power saving mode appropriate for the current velocity, position, and TNE computed in step 320. The possible power saving modes are practically endless, as would be understood by one of ordinary skill in the art. In general, power saving modes comprise one or more changes in the normal operation of at least one of hardware and software in mobile terminal 200. For example, a hardware change in a power saving mode would typically consist of powering down a component normally used in determining position updates. Such components may include, but are not limited to, GNSS receiver 210A, one or more of sensors 220, and one or more processors 240. One or more processors 240 are included because, although possibly still used for other applications currently running on mobile terminal 200 (in other words, although still powered and fully "on"), one or more processors 240 may not perform the processing, computing, and/or other tasks required for calculating position/velocity, depending on the power saving mode, thereby still saving battery power.

More generally, possible power saving modes are distinguished in hardware by at least one of (1) which components are powered down; (2) how much the components are powered down; and/or (3) the length of time the components powered down, and may feature regular and/or intermittent changes in any one of (1), (2), and (3) over time. For example, in one power saving mode, GNSS receiver 210A may be completely turned off in the TBE, while some of the sensors 220 used for calculating position/velocity stay on. The power saving modes are distinguished in software (and reflected in the power saved by, inter alia, one or more processors 240 performing less computing) by at least one of (1) changing the number and frequency of "full" position/velocity updates (i.e., "accurate updates" as defined above); (2) changing the number and frequency of mapping/navigational data updates (e.g., retrievals from mapping server 253), and/or (3) changing one or more parameters used in generating update (1) and/or (2), and may feature regular and/or intermittent changes in any of (1), (2), or (3) over time. For example, in a power saving mode appropriate for traversing a desert highway, an accurate update of the position of mobile terminal 200 may be relatively infrequent, while the velocity may be regularly updated (requiring the processing of raw data provided by sensors 220) to ensure that the initial estimated path of travel is still roughly on target (i.e., if mobile terminal 200 has either sped up or slowed down a lot, the TBE may need to be adjusted).

Examples of power saving modes that would be appropriate to select in step 330 are, e.g., changing to a 0.1 Hz rate for updating mobile terminal 200's position in the situation shown in FIG. 3B, and changing to a 0.5 Hz rate for updating mobile terminal 200's position in the situation shown in FIG. 3C. The 0.1 Hz rate (=10 seconds between updates) is appropriate for the freeway shown in FIG. 3B, considering the speed at which mobile terminal 200 is travelling and the relatively long distance between locations for possible events 321 and 322. The 0.5 Hz (=2 seconds between updates) is appropriate for the city street shown in FIG. 3C, considering the speed at which mobile terminal 200 is travelling and the relatively short distances between locations for possible events 323-326. In some embodiments, the power saving mode would keep the reduced update rate, e.g., 0.1 or 0.5 Hz, until a certain time and/or distance before the next event, at which point the update rate would increase or return to normal, which is for most consumer grade applications is 1 Hz.

In step 340, the changes in hardware/software corresponding to the selected power mode are made—in this embodiment, the power modes differ by at least one of which components are powered down and for how long (i.e., the update rate). Step 340 comprises powering down components and, while waiting for the next position update/fix according to the update rate, making position estimates. Thus, for example, if the update rate in the selected power mode is 0.1 Hz, the components would power down for 10 seconds or less, waiting for the next position update/fix, and estimated position updates/fixes are made in the interim.

Estimating the position of mobile terminal 200 during these waiting periods according to embodiments of the present invention is open to a wide variety of implementations. For example, Kalman filters are typically used in calculating GNSS solutions in order to smooth out errors/variations caused by, e.g., incorrect position calculations and/or changes in velocity. Put in simple terms, Kalman filters use a kind of feedback loop, using the previously calculated position to predict the present position and then adjusts that prediction using the measured current position (provided by GNSS) to end up with a calculated present position. When GNSS is not being used, i.e., during the waiting period, the measured current position used by the Kalman filter can be an estimated position based on using at least one of measured velocity, measured acceleration, the route indicated by the mapping data, and/or aggregate data from data aggregation/analysis server 263.

In embodiments using aggregate data from data aggregation/analysis server 263 in order to estimate position update/fixes, the data aggregated from portable devices travelling in that specific region at roughly the same time are used to estimate the likely distance travelled by mobile terminal 200 along that road/highway. Furthermore, in aggregate data embodiments, the manner of estimation may vary by the amount and "distance" from the specific time/location of the aggregated data. In other words, if there are, for example, 10 or more data points for that specific location on that road/highway at that specific time of day (and perhaps that specific day of the week), it would be considered enough to calculate an estimate for mobile terminal 200 by, e.g., averaging the data points. If, however, there are only two data points, the system would automatically increase the data pool by including data points from adjacent sections of the same road/highway before providing an estimate.

In step 345, the time to the next position update/fix is up (i.e., the waiting period of step 340 is over), and a full position update/fix using GNSS is made. A position update/fix may or may not be possible, so after step 345, the method shown in FIG. 3A either loops back to step 320 if a position update/fix is possible, or proceeds to step 350 if no position update/fix can be made. In step 350, according to this embodiment, all of the components remain on until a position update/fix can be made, at which point the method loops back to step 320. When the method of FIG. 3A loops back to step 320, from either step 345 or 350, the time to next event (TNE) is again computed, based on the current position, velocity, and mapping data. Generally, the method in FIG. 3A keeps looping, re-computing the TNE and re-selecting the power saving mode, until an external condition, such as mobile terminal 200 being turned off, stops the operation of mapping/navigational client 251 and data aggregation/analysis client 261.

FIG. 4 is a flowchart of a method to minimize the power used during navigation by mobile terminal 200 according to an embodiment of the present invention, where, inter alia, the time remaining for battery usage under various application scenarios is calculated and re-calculated.

In step 410 of FIG. 4, the user of mobile terminal 200 enters destination information for mapping/navigation client 251 to calculate a navigational solution, i.e., a route to take, from the user's current location to the destination. In step 420, the amount of power remaining in battery 235A is determined by battery diagnostics/monitoring application 230A, and data aggregation/analysis client 261 uses at least the determined remaining battery power to compute the time before battery 235A would run out under various application scenarios. Possible application scenarios include, without limitation, having all applications currently running on mobile terminal 200 remain running during the entirety of the trip, having one or more applications running for a set, calculated, or estimated amount of time during the trip (such as expecting 15 minutes of audio telephone usage for every two hours and the like), and having a set, calculated, or estimated combination of applications operating during the trip, where each application operates for a set, calculated, or estimated amount of time. In some embodiments, step 420 is performed using data and/or analysis from data aggregation/analysis server 263. In those embodiments, the applications and the amount of time each is running is determined based on the aggregated data from users making the same trip, or based on collecting together the aggregate data from users travelling on the one or more links making up the entirety of the calculated navigational solution.

In step 430, the user of mobile terminal 200 is sent, if necessary, warnings and operational recommendations. Such warnings include, for example, warning the user that the battery power will not last until the destination, or that mobile terminal 200 is going to use power saving modes during all or parts of the trip. Operational recommendations include, for example, recommending that certain applications not be run during the trip in order that the battery power last as long as it can and/or displaying estimated times certain applications can be run during the trip. In step 435, if it has been determined that there is not enough battery power remaining, mapping/navigational client 251 shuts down, ending the method at step 470. If there is enough battery power remaining in step 435, the method proceeds to step 440.

In step 440, the events in the route to the destination are determined, and power saving modes are selected for each segment, i.e., between events, of the trip ("piecewise"). Next, in step 450, the trip starts, if this is the initial iteration through the loop of the method in FIG. 4, or continues, if it is after the initial iteration. In step 455, it is determined whether mobile terminal 200 is near the end of the trip. If it is not near journey's end in step 455, the method loops back to step 420. If it is near journey's end in step 455, mobile terminal 200 switches to "normal" navigation mode in step 460 (i.e., no more power saving modes for the rest of the trip). Once the journey ends in step 460, mapping/navigational client 251 shuts down in step 470. Generally, the method in FIG. 4 keeps looping, re-computing time remaining for various application scenarios and re-selecting power saving modes for the remaining route, until mobile terminal 200 nears journey's end in step 455, after which it switches to normal navigation mode and then shuts down mapping/navigational client 251 at journey's end.

FIG. 5 is a flowchart of a method to compute battery life according to an embodiment of the present invention. In step 510, battery diagnostic/monitoring application 230A determines the current estimated power remaining in battery 235A. In step 520, the amount of battery power, or charge, measured in milliamp-hours (mAh), required for making navigational position updates/fixes for the remaining portions of the computed route is estimated. In step 530, the amount of battery power required for any other functions performed by, and/or applications run on, mobile terminal 200 for the remaining portions of the computed route is estimated. In step 540, the estimates from steps 520 and 530 are added together, and that total is compared to the actual current estimated power remaining from step 510. In step 545, if the estimated total battery power required for the remainder of the trip is greater than the current battery power remaining, the mapping/navigational client 251 turns off and the method ends in step 560. If the estimated total battery power required for the remainder of the trip is less than the current battery power remaining in step 545, the mapping/navigational client 251 continues navigating in step 550. After a predetermined period, the method loops back and begins again at step 510.

Using the methods, and/or variations on the methods, shown in FIGS. 3A, 4, and 5, the effective power consumption of mobile terminal 200 can be reduced and/or adapted using at least the following:

(1) estimated battery life, including, e.g., remaining battery life, of mobile terminal 200 based on, inter alia, applications currently running, as well as aggregate data concerning the specific region mobile terminal 200 is traversing and/or computing a projected route through, where this estimate can be adaptively changed as mobile terminal 200 is en route;

(2) known/approximate battery drain characteristics of different power modes of mobile terminal 200, different power saving modes, different GNSS update/fix rates, different applications and/or combinations of applications, previous traversals of the same region, etc., which can be based on aggregate data from other users as well as mobile terminal 200's past history, where estimates/power saving modes selected based on these battery drain characteristics can be adaptively changed as mobile terminal 200 is en route; and (3) mapping data used for selecting power saving modes, estimating power/resource usage, determining events (either upcoming or on a projected/-planned navigational route), estimating mobile terminal 200's position without using GNSS, etc., where selections, estimates, and/or determinations based on mapping data can be adaptively changed based on actual conditions as mobile terminal 200 is en route.

In FIG. 4 above, a warning that the battery may not last is given to the user of mobile terminal 200 before starting a projected trip. In embodiments of the present invention, such warnings may be given the user during the trip, as well as any time mobile terminal 200 is on (i.e., even if no trip is/was projected). Warnings may also be given when mobile terminal 200 is adapting power consumption parameters to the parameters of the planned/navigated route, even if the battery is estimated to last the entire route. Similarly, operational recommendations may be given the user at any time, and whether on a planned/navigated route or not, such as estimated battery life if one or more applications are run for specific periods of time on mobile terminal 200, recommendations not to run one or more specific power-intensive applications for more than a set time period, etc.

The user may provide input and/or directly control power saving modes and other parameters according to embodiments of the present invention. For example, the user may choose to use the highest power saving mode (with the lowest positional update/fix rate) when walking through a city using mapping/navigational client 251 to find a place or address.

Embodiments according to the present invention can also provide positional update/fix rates faster than normal rates when advisable and/or required by conditions shown in mapping data, such as, e.g., a large number of exits, multiple possible turns, and/or necessary lane changes in the specific location of mobile terminal 200. Such faster rates may also be indicated by aggregate data which shows frequent user errors/deviations from a navigated route at that specific location.

Embodiments according to the present invention can also power down components other than those used for GNSS reception, processing and computing. For example, depending on the applications currently being used on mobile terminal 200, a method according to an embodiment of the present invention may power down the display and display processing components in mobile terminal 200 when the TNE is substantial. In such an embodiment, the turning off and the subsequent turning back on of the display would serve as additional cues to the user concerning when and where actions need to be taken (or not) on the route.

The component diagrams of the present application would be understood by one of ordinary skill in the art as conceptual in the sense that, although hardware is necessarily involved with all of the functions described in reference thereto, the individual functions depicted therein may be merged together and/or further separated out (by dividing a function into sub-functions), and may be performed by software, hardware, or a combination of the two. For example, although mapping/navigational module 150 and data aggregator/analyzer 160 are shown as separate entities in FIG. 1, one, some, or all of their functions may be performed in the same hardware, software, or combination of the two.

Moreover, embodiments of the present invention as described above may be implemented by variety of methods, with a variety of options, as would be known to one of ordinary skill in the art. For example, embodiments of the present invention may be implemented in hardware, software, or a combination of hardware and software. Embodiments of the present invention implemented in software may be implemented in software executed by one or more processors using various operating systems or various platforms. In addition, this software may be written by using any programming language among multiple appropriate programming languages. This software may be compiled into an executable machine language code or intermediate code, which is executed by a framework or a virtual machine. Also, when the embodiments of the present invention are executed by one or more processors, the embodiments of the present invention may be implemented by using processor-readable mediums (e.g., a memory, a floppy disk, a hard disk, a compact disk, an optical disk, and a magnetic tape) for recording one or more programs for performing the methods which implement the various embodiments of the present invention as discussed above.

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method for reducing power consumption of a portable device capable of receiving satellite navigational system signals, comprising:
   retrieving information concerning one or more power usage characteristics corresponding to a current location of the portable device, where the power usage information is based on aggregate data from power usage data of one or more portable devices which receive satellite navigational system signals and which have traversed or are traversing the current location; and
   selecting a power saving mode from a plurality of power saving modes based at least on the retrieved power usage information from the aggregate data, where each of the plurality of power saving modes reduces power used by the portable device in at least one of receiving the satellite navigational system signals, processing the satellite navigational system signals, and computing the portable device's position using the satellite navigational system signals.

2. The method of claim 1, wherein the power usage information is retrieved over a wireless communication link.

3. The method of claim 1, wherein the power usage information is retrieved at least one of from data storage in the portable device and over a wired communication link.

4. The method of claim 1, wherein the power usage characteristics corresponding to the current location comprise characteristics of at least one of velocity, acceleration, battery power consumption, duration, time spent traversing one or more segments of a route, time of day, and day of the week.

5. A method for a portable device having a mapping client and a receiver of satellite navigational system signals, comprising:
   retrieving map data of a current location of the portable device;
   computing at least one of a time until next event (TNE) and a time between events (TBE) based on the retrieved map data; and
   selecting a power saving mode from a plurality of power saving modes based on at least one of TNE and TBE, where each of the plurality of power saving modes reduces power used by the portable device in at least one of receiving the satellite navigational system signals, processing the satellite navigational system signals, and computing the portable device's position using the satellite navigational system signals.

6. The method of claim 5, wherein each of the plurality of power saving modes reduces the power used in computing the portable device's position using the satellite navigational system signals by reducing a rate at which positional updates/fixes are made using satellite navigational system signals.

7. The method of claim 5, wherein the retrieved map data comprises identified events.

8. The method of claim 5, further comprising:
identifying locations and/or features in the retrieved map data corresponding to events.

9. A method for reducing power consumption in a portable device capable of receiving satellite navigational system signals, comprising:
computing a route to a destination; and
selecting a power saving mode from a plurality of power saving modes for each of one or more segments of the computed route based at least on one or more characteristics of the one or more segments, where each of the plurality of power saving modes reduces power used by the portable device in at least one of receiving the satellite navigational system signals, processing the satellite navigational system signals, and computing the portable device's position using the satellite navigational system signals.

10. The method of claim 9, further comprising:
retrieving map data corresponding to the computed route.

11. The method of claim 10, wherein selecting the power saving mode comprises:
computing at least one of a time until next event (TNE) and a time between events (TBE) for each of one or more segments of the computed route based on the retrieved map data, wherein the computed at least one of TNE and TBE comprise the one or more characteristics the power saving mode selection is based on.

12. The method of claim 9, further comprising:
retrieving information concerning one or more power usage characteristics corresponding to each of the one or more segments of the computed route, where the power usage information is based on aggregate data from power usage data of one or more portable devices traversing the one or more segments, wherein the retrieved power usage information from the aggregate data comprise the one or more characteristics the power saving mode selection is based on.

13. A method for a portable device to reduce power used in receiving and processing of satellite navigational system signals, comprising:
reducing a rate at which the portable device's positional updates/fixes are made using satellite navigational system signals; and
estimating a current position of the portable device in between the positional updates/fixes that use satellite navigational system signals by using map data of a specific region the portable device is traversing.

14. The method of claim 13, wherein an amount by which the positional update/fix rate is reduced is based on the map data of the specific region the portable device is traversing.

15. The method of claim 13, wherein an amount by which the positional update/fix rate is reduced is based on at least one of a time until next event (TNE) and a time between events (TBE) computed from the map data.

16. The method of claim 13, wherein an amount by which the positional update/fix rate is reduced is based on information concerning one or more power usage characteristics corresponding to the specific region the portable device is traversing, where the power usage information is based on aggregate data from power usage data of one or more portable devices traversing the specific region.

17. The method of claim 13, wherein estimating the current position uses one or more features of a route defined in the map data, wherein one or more previous positional updates/fixes indicate that the portable device is traversing the route.

18. A portable device, comprising:
a receiver configured to receive satellite navigational system signals;
one or more processors; and
at least one non-transitory computer-readable medium having program instructions recorded thereon, the program instructions configured to have the one or more processors perform the step of:
selecting a power saving mode for a specific region of traversal by the portable device from a plurality of power saving modes based on one or more characteristics of the specific region of traversal, where each of the plurality of power saving modes reduces power used by the portable device in at least one of receiving the satellite navigational system signals, processing the satellite navigational system signals, and computing the portable device's position using received satellite navigational system signals.

19. The portable device of claim 18, wherein the program instructions are further configured to have the one or more processors perform the steps of:
retrieving map data of the specific region of traversal by the portable device; and
computing at least one of a time until next event (TNE) and a time between events (TBE) based on the retrieved map data,
wherein the power saving mode is selected using at least one of the TNE and TBE.

20. The portable device of claim 18, wherein the program instructions are further configured to have the one or more processors perform the step of:
retrieving information concerning one or more power usage characteristics corresponding to the specific region of traversal, where the power usage information is based on aggregate data from power usage data of one or more portable devices traversing the specific region,
wherein the power saving mode is selected using the retrieved power usage information from the aggregate data.

21. The portable device of claim 18, wherein the specific region of traversal is one of currently being traversed by the portable device, about to be traversed by the portable device, and on a route to a destination computed using the portable device.

22. A portable device, comprising:
a receiver configured to receive at least satellite navigational system signals;
one or more processors; and
at least one non-transitory computer-readable medium having program instructions recorded thereon, the program instructions configured to have the one or more processors perform and/or otherwise control performance of the steps of:
retrieving map data of a specific region which the portable device is presently in;
reducing a rate at which positional updates/fixes are made using the satellite navigational system signals; and
estimating a current position of the portable device in between the positional updates/fixes that use satellite navigational system signals by using the retrieved map data.

23. A system for reducing the power used by portable devices to receiving satellite navigational system signals, comprising:
one or more data aggregation servers configured to receive power usage data from one or more portable devices, the power usage data concerning the one or more portable devices' traversal of a specific region, to aggregate received power usage data such that power usage characteristics are determined for one or more specific locations in specific regions, and to provide information concerning determined power usage characteristics for one or more locations in a specific region to one or more portable devices, wherein the one or more portable devices use the provided information to select a power saving mode for traversing the one or more locations in the specific region from a plurality of power saving modes, where each of the plurality of power saving modes reduce power used by the one or more portable devices in at least one of receiving the satellite navigational system signals, processing the satellite navigational system signals, and computing the portable device's position using the satellite navigational system signals.

24. The system of claim 23, wherein the power usage data comprises data about at least one of velocity, acceleration, battery power consumption, duration, time spent traversing one or more segments of a route, time of day, and day of the week.

* * * * *